United States Patent
Clements

(10) Patent No.: US 10,907,598 B2
(45) Date of Patent: Feb. 2, 2021

(54) SELF-LIMITING REGENERATIVE PUMPING ELEMENT START STAGE FOR HIGH SPEED CENTRIFUGAL ENGINE FUEL PUMP AND ASSOCIATED METHOD

(71) Applicant: EATON INTELLIGENT POWER LIMITED, Dublin (IE)

(72) Inventor: Martin A. Clements, West Chester, OH (US)

(73) Assignee: Eaton Intelligent Power Limited, Dublin (IE)

( * ) Notice: Subject to any disclaimer, the term of this patent is extended or adjusted under 35 U.S.C. 154(b) by 13 days.

(21) Appl. No.: 16/295,418

(22) Filed: Mar. 7, 2019

(65) Prior Publication Data

US 2019/0277233 A1 Sep. 12, 2019

Related U.S. Application Data

(60) Provisional application No. 62/639,745, filed on Mar. 7, 2018, provisional application No. 62/666,905, filed on May 4, 2018.

(51) Int. Cl.
*F02M 59/44* (2006.01)
*B64D 37/00* (2006.01)
(Continued)

(52) U.S. Cl.
CPC ......... *F02M 59/447* (2013.01); *B64D 37/005* (2013.01); *F02M 37/048* (2013.01);
(Continued)

(58) Field of Classification Search
CPC .. F02M 59/447; F02M 37/048; B64D 37/005; B64D 37/14; F04D 15/0209;
(Continued)

(56) References Cited

U.S. PATENT DOCUMENTS 5,456,574 A    10/1995 Donnelly et al.
6,022,197 A *  2/2000 Cygnor .................... F02C 7/236
                                                417/203
6,059,537 A *  5/2000 Cygnor .................... F04D 13/12
                                                417/203

FOREIGN PATENT DOCUMENTS

GB          1392783 A       4/1975
WO   WO 2007/095047 A2     8/2007
(Continued)

*Primary Examiner* — Joseph J Dallo
(74) *Attorney, Agent, or Firm* — Fay Sharpe LLP

(57) ABSTRACT

An engine fuel or pump system includes a centrifugal pump having an impeller for imparting energy to an associated fluid for an associated downstream engine fuel system. A regenerative start stage is in selective fluid communication with the pump. And ejector includes an inlet that communicates with the pump outlet and an outlet that communicates with the pump inlet. Further, a regulator valve is interposed between the pump outlet and the regenerative start stage that selectively regulates associated flow from the regenerative start stage. The associated method include directing flow from the centrifugal pump to a regenerative start stage in order to supply an associated downstream flow circuit. During low speed starting, a portion of the flow from the regenerative start stage is provided to an ejector that recirculates to an inlet of the centrifugal pump. Once the centrifugal pump provides a predetermined level of at least one of the flow and pressure requirements of the associated flow circuit, the method includes terminating flow from the regenerative start stage.

20 Claims, 2 Drawing Sheets

(51) Int. Cl.
- *F04D 15/02* (2006.01)
- *F04D 5/00* (2006.01)
- *F04D 7/02* (2006.01)
- *F02M 37/04* (2006.01)

(52) U.S. Cl.
CPC .............. *F04D 5/007* (2013.01); *F04D 7/02* (2013.01); *F04D 15/0209* (2013.01)

(58) Field of Classification Search
CPC . F04D 5/007; F04D 7/02; F04D 9/044; F04D 5/002; F04D 13/12; F02C 7/236
See application file for complete search history.

(56) References Cited

FOREIGN PATENT DOCUMENTS

| | | | |
|---|---|---|---|
| WO | WO-2007095047 A2 * | 8/2007 | .............. F02C 7/236 |
| WO | WO-2007095047 A3 * | 12/2008 | .............. F02C 7/236 |

\* cited by examiner

SELF-LIMITING REGENERATIVE PUMPING ELEMENT START STAGE FOR HIGH SPEED CENTRIFUGAL ENGINE FUEL PUMP AND ASSOCIATED METHOD

This application claims the priority benefit of U.S. provisional applications, Ser. No. 62/639,745, filed Mar. 7, 2018 and 62/666,905, filed May 4, 2018, the disclosures of which are expressly incorporated herein by reference.

BACKGROUND

This invention relates to a fluid pump system, and particularly a pumping system requiring different demands at start-up. More particularly, this invention relates to an aircraft engine fuel system that employs a high-speed centrifugal pump, and one that addresses the need to perform engine starting, i.e., provide adequate flow and pressure at a low drive speed.

High-speed centrifugal pumps have distinct advantages in minimizing aircraft engine fuel pump weight and manufacturing cost. For these reasons, fuel system designers have attempted to incorporate the high-speed centrifugal pump into aircraft engine fuel systems. These attempts are most often found inadequate due to the inability of the high speed centrifugal pump to perform engine starting. That is, engine starting requires sufficient flow and sufficient pressure at a low drive speed. Assistance from a second engine or start pump is generally used to perform the engine start. In most cases, the second pump increases both system weight and cost, thereby negating the reasons to use the high-speed centrifugal pump. Further issues arise from the need to disengage the start pump so as not to create an excessive amount of pumping energy that must be absorbed as heat into the fuel system.

Systems previously proposed have undesirable modes which allow the regenerative stage to remain engaged in pumping fluid to the fuel system. Should this occur, the prior systems that incorporate regenerative stages could undesirably produce system pressures far in excess of the system needs, and thus it would be desired to have an arrangement that self-limits pressure production and thereby protects the fuel system from the potential of over-pressurization.

A need exists for an improved arrangement that addresses at least one or more of the above-described problems. That is, it would be desirable to provide secondary pumping function for start-up purposes that would not negate the weight and cost advantages of the high speed centrifugal pump, while advantageously retaining the advantages and benefits of using the high-speed centrifugal pump in an engine fuel system, and that protects a fuel system from the potential of over-pressurization.

SUMMARY

An engine fuel system is provided that addresses the need for a secondary pumping function for start-up purposes, and that does not negate the weight and cost advantages of a high speed centrifugal pump.

The engine fuel system uses a regenerative type pump element, an ejector pump, and a series of valves to control the start process in conjunction with the high-speed centrifugal pump.

The engine fuel or pump system includes a pump having an inlet and outlet that communicate with a rotary kinetic pumping element for imparting energy to an associated fluid for an associated downstream flow circuit. A regenerative start stage is in selective fluid communication with the pump. An ejector includes an inlet that communicates with the pump outlet and an outlet that communicates with the pump inlet. Further, a regulator valve is interposed between the pump outlet and the regenerative start stage that selectively controls associated flow from the regenerative start stage.

The regulator valve communicates with the pump outlet and selectively directs fluid therefrom to an inlet of the regenerative start stage.

The regulator valve is responsive to pressure signals from the pump outlet and from upstream of the pump inlet.

The regulator valve is configured to monitor flow from the pump outlet and supply inlet flow to the regenerative start stage until the pump provides predetermined flow and/or pressure requirements of the associated flow circuit.

The pump and regenerative start stage may be commonly driven by a first shaft.

The ejector receives flow from the pump outlet.

The ejector communicates with the regenerative start stage in order to scavenge fluid therefrom once the pump provides the predetermined flow and/or pressure requirements for the associated flow circuit.

The ejector recirculates flow from the pump outlet to the pump inlet.

The regenerative start stage is in fluid communication with both the ejector and the associated downstream flow circuit so that during start-up, the regenerative start stage contributes flow to both the ejector and the associated downstream engine fuel system.

The ejector receives flow from the regenerative start stage during start-up and is configured to recirculate flow from the regenerative start stage to the pump inlet.

The system provides flow from the regenerative start stage until the pump provides at least one of predetermined flow and pressure requirements of the associated downstream flow circuit, and thereafter the ejector evacuates fluid from the regenerative start stage and thereby decouples the regenerative start stage from the pump system.

The system further includes a first check valve downstream of the centrifugal pump outlet that is biased toward a closed position so that when in a closed position, flow from the centrifugal pump outlet is directed to the regulator valve of the regenerative start stage.

The first check valve opens when the pump reaches at least one of predetermined flow and pressure requirements of the associated downstream engine fuel system.

The system further includes a second check valve downstream of the regenerative start stage that allows flow from the regenerative start stage during start-up.

A method of providing flow to an associated downstream flow circuit during start-up and transitioning to flow from a centrifugal pump is provided.

The method includes providing fuel from a fuel source to the centrifugal pump. During low speed starting of approximately less than 10% of engine shaft speed, the method includes directing flow from the centrifugal pump to a regenerative start stage in order to supply an associated engine fuel system (flow circuit). During the low speed starting, a portion of the flow from the regenerative start stage is provided to an ejector that recirculates to an inlet of the centrifugal pump. Once the centrifugal pump provides a predetermined level of at least one of the flow and pressure requirements of the associated flow circuit, the method includes terminating flow from the regenerative start stage to the associated flow circuit.

Once the centrifugal pump provides the predetermined level of at least one of the flow pressure requirements of the associated flow circuit/engine fuel system, the ejector empties fluid from the regenerative start stage in order to isolate the regenerative start stage from the associated flow circuit/engine fuel system.

The method further includes transitioning flow requirements for the associated engine fuel system from initially supplying flow from the regenerative start stage to subsequently supplying the associated flow circuit/engine fuel system from the centrifugal pump, wherein the transitioning occurs when an outlet pressure of the centrifugal pump exceeds a pressure output of the regenerative start stage.

Once the centrifugal pump provides the predetermined level of at least one of the flow pressure requirements of the associated flow circuit/engine fuel system, the ejector empties fluid from the regenerative start stage in order to isolate the regenerative start stage from the associated flow circuit/engine fuel system.

The method further includes regulating flow from the centrifugal pump through the regenerative start stage based on monitoring outlet pressure of the pump and inlet pressure to the centrifugal pump.

The method further includes driving the centrifugal pump and the regenerative start stage from a common shaft, and selectively reducing the power consumed by the regenerative start stage after start-up.

A primary advantage relates to minimizing both aircraft engine fuel pump weight and manufacturing cost by using a high-speed centrifugal pump with assistance from a second, start-up pump arrangement that does not negate the advantages of the centrifugal pump.

Another benefit resides in the ability to unload the start-up pump stage from the system once at least one of sufficient flow and pressure is provided by the—speed centrifugal pump.

Still another advantage is associated with the ability to scavenge or evacuate the start-up pump stage cavity in order to effectively decouple the start-up pump stage from the system.

Yet another advantage is the ability to protect the system by limiting/self-limiting the potential for over-pressurization.

Still other benefits and advantages of the present disclosure will become more apparent from reading and understanding the following detailed description.

DETAILED DESCRIPTION

Figure 1:
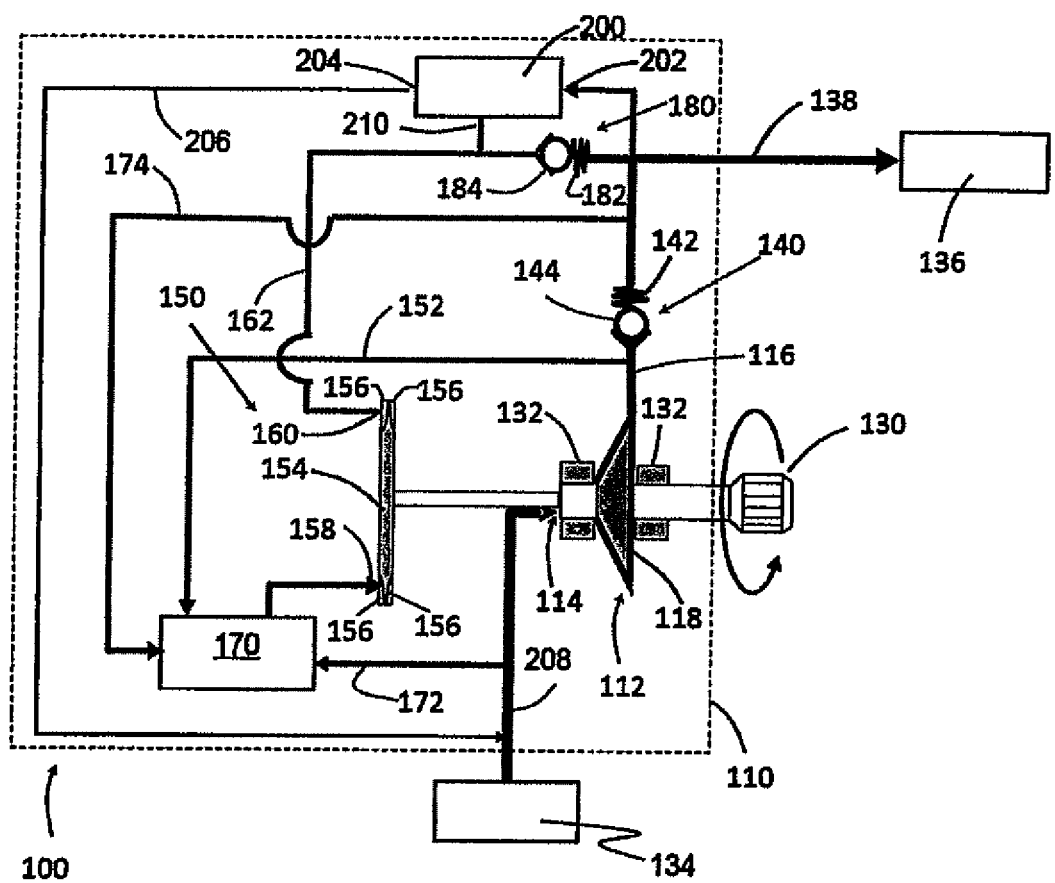
FIG. 1 is a schematic representation of the present invention.

The following description with reference to the accompanying drawing is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

Various exemplary embodiments of the present disclosure are not limited to the specific details of different embodiments and should be construed as including all changes and/or equivalents or substitutes included in the ideas and technological scope of the appended claims. In describing the drawings, where possible, similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A and/or B" used in the present disclosure include any and all combinations of words enumerated with them. For example, "A or B" or "at least one of A and/or B" means including A only, including B only, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, fourth, etc.). The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being operatively "connected" to or "coupled" to or "in communication" with another element, the element may be directly connected to, coupled to, or in communication with another element, and there may be an intervening element between the element and another element. To the contrary, it will be understood that, when an element is mentioned as being "directly connected", "directly coupled", or "directly communicating" with another element, there is no intervening element between the element and another element.

The terms used in the various exemplary embodiments of the present disclosure are for the purpose of describing specific exemplary embodiments only and are not intended to limit different or various exemplary embodiments of the present disclosure. As used herein, the singular forms are intended to include the plural forms as well, unless the context clearly indicates otherwise.

All of the terms used herein (including technical or scientific terms) have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Turning initially to FIG. 1, there is shown a fluid system 100, particularly a pumping system 110 requiring different demands at start-up. More specifically, a preferred embodiment of this system 100 is a flow circuit or an aircraft engine fuel system that includes the pump system 110. The pump system 110 preferably employs a high-speed pump 112, for example a centrifugal pump, having a pump inlet 114 and a pump outlet 116. A rotary kinetic pumping element such as an impeller 118 is schematically represented in FIG. 1. Those skilled in the art will appreciate that the impeller 118 is received for rotational movement relative to the centrifugal pump housing (not shown), and that the inlet 114 and outlet 116 are provided at desired locations in the housing and communicate with a pump cavity that receives the impeller. The centrifugal impeller is driven by a shaft 130 supported by suitable bearings 132 in a manner well-known in the art. Fluid, such as engine fuel, is provided from a suitable fluid source 134. Rotation of the impeller 118 by the shaft 130 imparts energy to the fluid where the pressurized fluid is provided for an associated main flow circuit or engine fuel system 136 via fluid passage 138. Details of the associated main flow circuit/engine fuel system 136 are conventional and form no part of the present invention so that further description herein is unnecessary to a full and complete understanding of the present disclosure. The impeller 118 is driven by drive shaft 130 at high speed and may range, for example, from 0 rpm to approximately 35,000 rpm, although the rotational speed of the impeller should not be deemed to limit the present invention.

As noted in the Background, fuel from source 134 is provided to a centrifugal pump to supply the downstream main flow circuit/engine fuel system 136. A need exists, however, to address engine starting or engine start-up issues, i.e., provide adequate flow and pressure at a low drive speed, particularly when a light weight, high speed rotary pump such as centrifugal pump 112 is used in the pumping system 100 and is unable on its own to provide sufficient flow and/or sufficient pressure at start-up speeds. The system 100 is modified as shown in FIG. 1 so that the centrifugal pump 112 supplies pressurized flow through a first check valve 140 (where the check valve includes a conventional biasing member or biasing spring 142 that imposes a predetermined closing force on conventional ball member 144) to the main flow circuit 136 via fluid passage 138 and also supplies a regenerative start stage or regenerative pump 150 via fluid passage 152 which receives flow from the centrifugal pump upstream of the first check valve.

The regenerative pump 150 (sometimes referred to as a regenerative turbine pump or peripheral pump) preferably has a rotating impeller 154 with vanes 156 on both sides of a peripheral portion thereof to generate high head or pressure between an inlet/suction 158 and outlet/discharge 160. The regenerative start stage 150 is driven by shaft 130 in the preferred embodiment, although it will be understood that a separate drive shaft could also be used. More particularly, pressurized fluid from the centrifugal pump outlet 116 flows through passage 152 to regulator valve 170 that is interposed between the centrifugal supply passage pump outlet 116 and the inlet 158 of the regenerative start stage. The regulator valve 170 controls, regulates, or limits the pressure output from the regenerative start stage 150 until the centrifugal pump 112 catches up i.e., until the centrifugal pump provides at least one of sufficient flow and/or sufficient pressure required for the associated downstream flow circuit or downstream engine fuel system 136. The regulator valve 170 receives pressure signals from upstream of the centrifugal pump 112 via fluid passage 172 and also from the pump outlet 138 via fluid passage 174. Until such time as the regulator valve 170 closes, the regenerative start stage 150 supplies pressurized flow during start-up to passage 138 through second check valve 180 via fluid passage 162. The second check valve 180 includes a biasing member or biasing spring 182 that imposes a preselected closing force on ball member 184. In this manner, startup flow from the regenerative start stage 150 supplies the associated downstream main flow circuit 136, until such time as the centrifugal pump 112 has developed sufficient flow and/or pressure to overcome the biasing force of the first check valve 140 and thereby supply the main flow circuit. At that time, the second check valve 180 closes to halt the flow of fluid from the regenerative start stage 150 from supplying pressurized fluid to the associated downstream system 136.

Further, once the centrifugal pump 112 supplies the main flow circuit, it is desirable to unload the regenerative start stage since the fluid passing therethrough would otherwise add undesirable heat to the system. At the transition point where the centrifugal stage output pressure is begins to provide to the main flow circuit, in addition to the first check valve opening, flow from the regenerative start stage is reduced to zero by closure of the regulator valve 170. Thus, further flow from the centrifugal stage 112 does not reach the inlet 158 of the regenerative start stage 150. As is also illustrated in FIG. 1, during start-up a portion of the flow from the pump discharge 138 is directed as a motive flow source to an ejector pump 200, namely a first or inlet port 202 thereof. A second or outlet/discharge port 204 recirculates flow from the ejector 200 via fluid passage 206 to supply passage 208 that communicates with the inlet 114 of the centrifugal pump 112. As noted above, fluid passage 172 communicates with the supply passage 208 to the regulator valve 170 so that once the regulator valve closes, all flow from the ejector 200 recirculates to the inlet 114 of the centrifugal pump 112. Since flow to the inlet port 202 of the ejector 200 is now provided by the centrifugal pump 112 after check valve 140 opens, the scavenge port 210 of the ejector 200 now has the capacity to evacuate the regenerative stage pumping cavity. Removal of the fluid from the regenerative stage pumping cavity results in any of the pumping power consumed by the regenerative start stage to be brought near zero thus effectively decoupling the regenerative start stage 150 from the system 100. In this manner, pumping capacity for the flow circuit 136 effectively transitions from the regenerative start stage 150 to the centrifugal pump 112.

The system schematically illustrated in FIG. 1 provides the secondary or start up pumping function via the regenerative start stage 150 in a manner that does not negate the weight and cost advantages of the high-speed centrifugal pump 112. The combination of the regenerative start stage 150, ejector pump 200, regulator valve 170, and check valves 140, 180 effectively and efficiently control the start process.

The associated method of providing flow to the main flow circuit during start-up and transitioning to the centrifugal pump is as follows. Fuel enters the high-speed centrifugal pumping stage 112 at pressure levels created by the supply, i.e., the airframe fuel system. The fuel is pressurized by the centrifugal pump action. In the case of low speed starting, typically less than 10% of shaft speed, the centrifugal stage 112 provides very little in the way of fuel pressurization. Fuel exiting the centrifugal stage 112 feeds both the regenerative start stage 150 through the start stage regulator valve 170, and the main flow circuit 136 via the first check valve 140.

Flow entering the regenerative start stage 150 is pressurized significantly by the regenerative pump element 154.

This flow exits the regenerative start stage through a second check valve 180 and enters the main flow circuit 136. The regulator valve 170 at the inlet to the regenerative stage 150 acts to throttle the flow supplied to the regenerative stage and thereby regulates the total pressurized pumping system 100 during the start phase. As drive speed increases, the pressure output of the centrifugal stage approaches and finally overtakes the regulated output of the regenerative start stage 150. At the point where the centrifugal stage output pressure overtakes the main circuit pressure level (sustained by the regulated regenerative stage 150), the first check valve 140 opens and flow is provided by the centrifugal pump stage 112 to the main circuit 136. Flow from the regenerative start stage is reduced to zero by the full closure of the regenerative stage inlet pressure regulator 170.

As regenerative start-up stage flow stops, the regenerative discharge check valve 180 closes and isolates the regenerative start stage 150 from the system 100. At that point, the ejector pump 200 which has always been scavenging fluid from the regenerative start stage discharge, now has the capacity to completely evacuate the regenerative stage pumping cavity. Upon evacuation of the regenerative stage pumping cavity, the pumping power consumed by the regenerative start stage 150 is brought near zero, thus effectively decoupling the start stage element.

The regenerative start stage 150 successfully produces pressure at low speed where the centrifugal stage 112 does not. The output pressure of the regenerative start stage 150 is regulated during the ramp up in drive speed. The centrifugal stage 112 then comes online smoothly without any disturbance in system output pressure and flow. Moreover, the regenerative start stage disengages from the remainder of the system by evacuation of the pump cavity and thereby does not subsequently add excessive pump energy and heat to the system.

Figure 2:
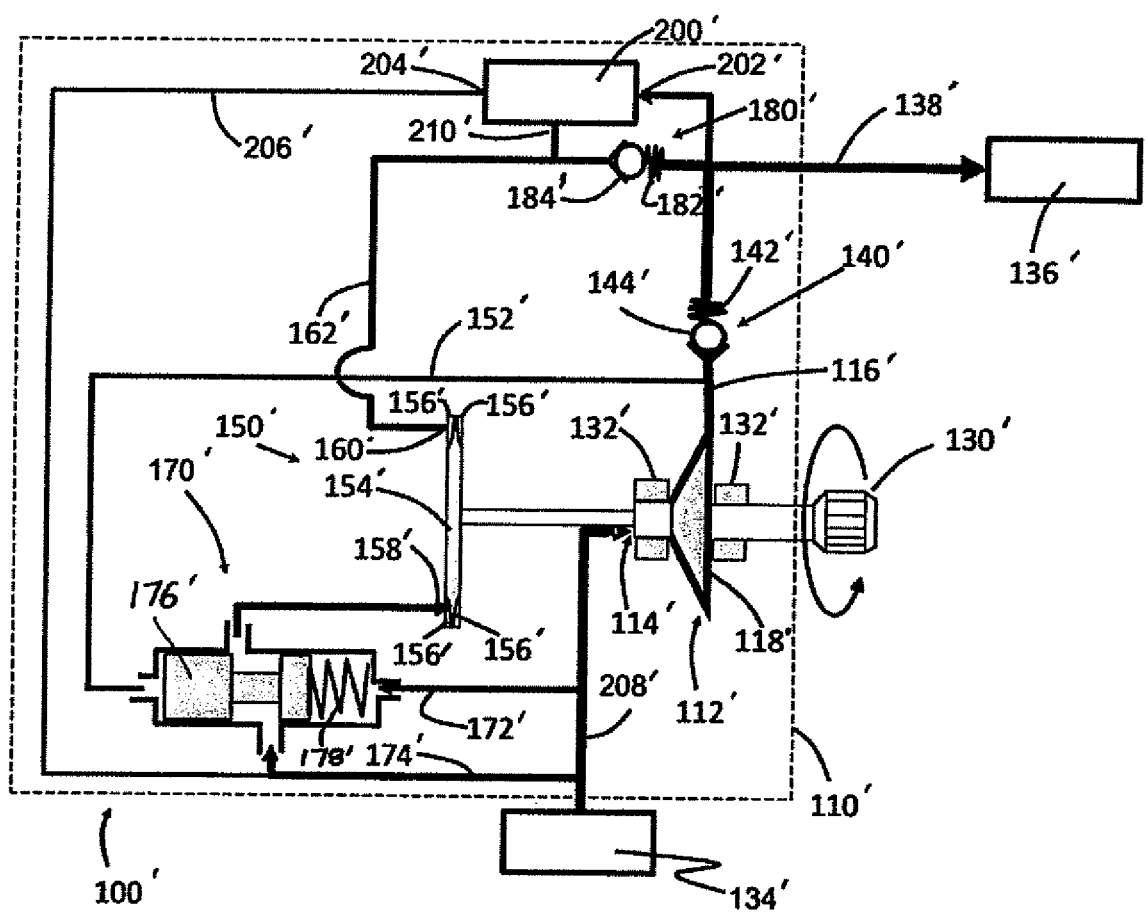
FIG. 2 is a modified, self-limiting regenerative pumping element start stage for a high speed centrifugal engine fuel pump.

Turning to FIG. 2, a second embodiment is shown and described. Like reference numerals with a primed suffix (') will refer to like components, and new elements will be referenced by new reference numerals. There is shown a fluid system 100', particularly a pumping system 110' requiring different demands at start-up. More specifically, a preferred embodiment of this system 100' is a flow circuit or an aircraft engine fuel system that includes the pump system 110'. The pump system 110' preferably employs a high-speed pump 112', for example a centrifugal pump, having a pump inlet 114' and a pump outlet 116'. A rotary kinetic pumping element such as an impeller 118' is schematically represented in FIG. 2. Those skilled in the art will appreciate that the impeller 118' is received for rotational movement relative to the centrifugal pump housing (not shown), and that the inlet 114' and outlet 116' are provided at desired locations in the housing and communicate with a pump cavity that receives the impeller. The centrifugal impeller 118' is driven by a shaft 130' supported by suitable bearings 132' in a manner well-known in the art. Fluid, such as engine fuel, is provided from a suitable fluid source 134'. Rotation of the impeller 118' by the shaft 130' imparts energy to the fluid where the pressurized fluid is provided for an associated main flow circuit or engine fuel system 136' via fluid passage 138'. Details of the associated main flow circuit/engine fuel system 136' are conventional and form no part of the present invention so that further description herein is unnecessary to a full and complete understanding of the present disclosure. The impeller 118' is driven by drive shaft 130' at high speed and may range, for example, from 0 rpm to approximately 35,000 rpm, although the rotational speed of the impeller should not be deemed to limit the present invention.

As noted in the Background, fuel from source 134' is provided to a centrifugal pump to supply the downstream main flow circuit/engine fuel system 136'. A need exists, however, to address engine starting or engine start-up issues, i.e., provide adequate flow and pressure at a low drive speed, particularly when a light weight, high speed rotary pump such as centrifugal pump 112' is used in the pumping system 100' and is unable on its own to provide sufficient flow and/or sufficient pressure at start-up speeds. The system 100' is modified as shown in FIG. 2 so that the centrifugal pump 112' supplies pressurized flow through a first check valve 140' (where the check valve includes a conventional biasing member or biasing spring 142' that imposes a predetermined closing force on conventional valve or ball member 144') to the main flow circuit 136' via fluid passage 138'. Upstream of the first check valve 140' is a pressure signal line 152' that branches to a regulator valve 170' in a manner to be described in greater detail below.

A regenerative start stage or regenerative pump 150' (sometimes referred to as a regenerative turbine pump or peripheral pump) is provided. The regenerative pump 150' preferably has a rotating impeller 154' with vanes 156' on both sides of a peripheral portion thereof to generate high head or pressure between an inlet/suction 158' and outlet/discharge 160'. The regenerative start stage 150' is driven by shaft 130' in the preferred embodiment, although it will be understood that a separate drive shaft could also be used. More particularly, fluid from the source 134' flows through passage 174' to regulator valve 170' that communicates with the inlet 158' of the regenerative start stage. The regulator valve 170' controls, regulates, or limits the pressure output from the regenerative start stage 150' until the centrifugal pump 112' catches up i.e., until the centrifugal pump provides at least one of sufficient flow and/or sufficient pressure required for the associated downstream flow circuit or downstream engine fuel system 136'. Specifically, the regulator valve 170' receives pressure signals from upstream of the centrifugal pump 112' via fluid passage 172' and also from the pump outlet 116' via fluid passage 152'. Until such time as the regulator valve 170' closes (when sufficient pressure is provided through signal passage 152' to urge valve member or valve spool 176' to a closed position that overcomes the biasing force of the spring 178' in the regulator valve), the regenerative start stage 150' supplies pressurized flow during start-up to passage 138' through second check valve 180' via fluid passage 162'. The second check valve 180' includes a biasing member or biasing spring 182' that imposes a preselected closing force on ball member 184'. In this manner, startup flow from the regenerative start stage 150' supplies the associated downstream main flow circuit 136' until such time as the centrifugal pump 112' has developed sufficient flow and/or pressure to overcome the biasing force of the first check valve 140' and thereby supply the main flow circuit. At that time, the second check valve 180' closes to halt the flow of fluid from the regenerative start stage 150' from supplying pressurized fluid to the associated downstream system 136'.

Further, once the centrifugal pump 112' supplies the main flow circuit, it is desirable to unload the regenerative start stage 150' since the fluid passing therethrough would otherwise add undesirable heat to the system. At the transition point where the centrifugal stage output pressure begins to provide flow to the main flow circuit, in addition to the first check valve 140' opening, flow from the regenerative start stage is reduced to zero by closure of the regulator valve 170'. Thus, further flow from the fluid source 134' does not reach the inlet 158' of the regenerative start stage 150'. As is also illustrated in FIG. 2, during start-up a portion of the flow in fluid line 138' is directed as a motive flow source to an ejector pump 200', namely a first or inlet port 202' thereof. A second or outlet/discharge port 204' recirculates flow from the ejector 200' via fluid passage 206' to supply passage 208' that communicates with the inlet 114' of the centrifugal pump 112'. As noted above, once the regulator valve 170' closes, all flow from the ejector 200' recirculates to the inlet 114' of the centrifugal pump 112'. Since flow to the inlet port 202' of the ejector 200' is now provided by the centrifugal pump 112' after check valve 140' opens, the scavenge port 210' of the ejector 200' now has the capacity to evacuate the regenerative stage pumping cavity. Removal of the fluid from the pumping cavity of the regenerative stage pump 150' results in any of the pumping power consumed by the regenerative start stage to be brought near zero thus effectively decoupling the regenerative start stage 150' from the system 100'. In this manner, pumping capacity for the flow circuit 136' effectively transitions from the regenerative start stage 150' to the centrifugal pump 112'.

Thus, in this second embodiment of FIG. 2, fluid is supplied to the inlet of the regenerative stage from pump inlet pressure instead of from the centrifugal stage discharge (FIG. 1). In doing so, complete filling of the regenerative stage 150' only occurs up to a certain shaft speed based mainly upon, for example, the regenerative wheel diameter and pump inlet pressure-which is not changing with pump speed. Therefore, a wheel diameter can be matched or paired with the desired cut off speed of the starting regenerative stage, thereby self-limiting the pressure producing process and protecting the fuel system from over pressurization.

The system schematically illustrated in FIG. 2 provides the secondary or start-up pumping function via the regenerative start stage 150' in a manner that does not negate the weight and cost advantages of the high-speed centrifugal pump 112'. The combination of the regenerative start stage 150', ejector pump 200', regulator valve 170', and check valves 140', 180' effectively and efficiently control the start process, and advantageously does so in a manner that limits the process of producing pressure and thereby protects the fuel system from over-pressurization.

The associated method of providing flow to the main flow circuit during start-up and transitioning to the centrifugal pump in connection with the FIG. 2 embodiment is as follows. Fuel enters the high-speed centrifugal pumping stage 112' at pressure levels created by the supply, i.e., the airframe fuel system. The fuel is pressurized by the centrifugal pump action. In the case of low speed starting, typically less than 10% of shaft speed, the centrifugal stage 112' provides very little in the way of fuel pressurization. Fuel exiting the centrifugal stage 112' feeds the main flow circuit 136' via the first check valve 140', and also provides a pressure signal to the regulator valve 170'.

Flow entering the regenerative start stage 150' via passage 174' from the airframe fuel system supply 134' is pressurized significantly by the regenerative pump element 154'. This flow exits the regenerative start stage through a second check valve 180' and enters the main flow circuit 136'. The regulator valve 170' at the inlet to the regenerative stage 150' acts to throttle the flow supplied to the regenerative stage and thereby regulates the total pressurized pumping system 100' during the start phase. As drive speed increases, the pressure output of the centrifugal stage 112' approaches and finally overtakes the regulated output of the regenerative start stage 150'. At the point where the centrifugal stage output pressure overtakes the main circuit pressure level (sustained by the regulated regenerative stage 150'), the first check valve 140' opens and flow is provided by the centrifugal pump stage 112' to the main circuit 136'. Flow from the regenerative start stage 150' is reduced to zero by the full closure of the regenerative stage inlet pressure regulator 170' as a result of the increased pressure from the outlet 116' of the centrifugal stage 112' via signal line 152' acting on the valve spool 176' to overcome the force of spring 178'.

As flow from the regenerative start-up stage 150' stops, the regenerative discharge check valve 180' closes and isolates the regenerative start stage 150' from the system 100'. At that point, the ejector pump 200' which has always been scavenging fluid from the regenerative start stage discharge, now has the capacity to completely evacuate the regenerative stage pumping cavity. Upon evacuation of the regenerative stage pumping cavity, the pumping power consumed by the regenerative start stage 150' is brought near zero, thus effectively decoupling the start stage element.

The regenerative start stage 150' successfully produces pressure at low speed where the centrifugal stage 112' does not. The output pressure of the regenerative start stage 150' is regulated during the ramp up in drive speed. The centrifugal stage 112' then comes online smoothly without any disturbance in system output pressure and flow. Moreover, the regenerative start stage 150' disengages from the remainder of the system by evacuation of the pump cavity and thereby does not subsequently add excessive pump energy and heat to the system.

This written description uses examples to describe the disclosure, including the best mode, and also to enable a person skilled in the art to make and use the disclosure. Other examples that occur to those skilled in the art are intended to be within the scope of the invention if they have structural elements that do not differ from the same concept, or if they include equivalent structural elements with insubstantial differences.

I claim:

1. A pump system comprising:
    a pump including an inlet and outlet that communicate with a rotary kinetic pumping element for imparting energy to an associated pump fluid directed toward an associated downstream flow circuit;
    a regenerative start stage in selective fluid communication with the pump;
    a first valve that precludes fluid communication between the pump outlet and the associated downstream flow circuit until the pump reaches one of a predetermined pressure or flow threshold;
    an ejector having an inlet that communicates with the pump outlet and the elector having an outlet that communicates with the pump inlet; and
    a regulator valve that selectively regulates associated fluid to the regenerative start stage, wherein the regulator valve is responsive to a first signal taken from between the pump outlet and the first valve.

2. The pump system of claim 1 wherein the regulator valve is also responsive to a second signal from upstream of the pump inlet.

3. The pump system of claim 1 wherein the regulator valve is configured to supply inlet flow to the regenerative start stage until the pump provides at least one of predetermined flow and pressure requirements of the associated downstream flow circuit.

4. The pump system of claim 1 wherein the regulator valve receives flow directly from a system fluid source.

5. The pump system of claim 1 wherein the ejector re flow from the regenerative start stage during start-up.

6. The pump system of claim 1 wherein the ejector recirculates flow from the pump outlet to the pump inlet.

7. The pump system of claim 1 wherein the regenerative start stage contributes flow to both the ejector and the associated downstream flow circuit during start-up.

8. The pump system of claim 7 wherein the ejector receives flow from the regenerative start stage during start-up and is configured to recirculate the flow to the pump inlet.

9. The pump system of claim 8 wherein the ejector receives flow from the regenerative start stage until the pump provides at least one of predetermined flow and pressure requirements of the associated downstream flow circuit, and thereafter the ejector evacuates fluid from the regenerative start stage and thereby decouples the regenerative start stage from the pump system.

10. The pump system of claim 1 wherein the regenerative start stage receives system fluid through the regulator valve in a valve open position.

11. A method of providing flow to a flow circuit during start-up and transitioning to flow from a centrifugal pump, the method comprising:
providing fuel from a fuel source to the centrifugal pump;
during low speed starting of approximately less than 10% of engine shaft speed, directing flow from the fuel source to a regenerative start stage in order to supply an associated downstream flow circuit;
during the low speed starting, a portion of the flow from the regenerative start stage is provided to an ejector that recirculates to an inlet of the centrifugal pump;
providing a regulator valve to regulate flow from the fuel source through the regenerative start stage based on receiving a first signal taken from between an outlet of the centrifugal pump and a first valve downstream thereof, and a second signal from upstream of an inlet of the centrifugal pump and thereby monitoring a pressure differential between the inlet and outlet of the centrifugal pump; and
once the centrifugal pump provides a predetermined level of at least one of the flow and pressure requirements of the associated flow circuit, terminating flow from the regenerative start stage to the associated main flow circuit.

12. The method of claim 11 wherein once the centrifugal pump provides the predetermined level of at least one of the flow and pressure requirements of the associated downstream flow circuit, the ejector removes fluid from the regenerative start stage in order to isolate the regenerative start stage from the system.

13. The method of claim 12 wherein a transition from flow requirements for the flow circuit includes initially supplying pressurized flow from the regenerative start stage and subsequently supplying pressurized flow from the centrifugal pump, and transitioning occurs when an outlet pressure of the centrifugal pump exceeds a pressure output of the regenerative start stage.

14. The method of claim 13 wherein once the centrifugal pump provides the predetermined level of at least one of the flow and pressure requirements of the associated downstream flow circuit, the ejector empties fluid from the regenerative start stage in order to isolate the regenerative start stage from the associated flow circuit.

15. The method of claim 11 further comprising driving the centrifugal pump and the regenerative start stage from a common shaft, and selectively reducing the power consumed by the regenerative start stage after start-up.

16. The pump system of claim 1 wherein the regulator valve has an inlet that receives flow directly from a system fluid source through a passage upstream of the pump.

17. The pump system of claim 16 wherein the regulator valve receives a second signal from upstream of the pump.

18. The pump system of claim 1 wherein the pump is a centrifugal pump.

19. The pump system of claim 18 wherein the regenerative start stage includes a rotating impeller with vanes to generate start-up flow or pressure for the associated downstream flow circuit.

20. The pump system of claim 19 wherein the regenerative start stage and the pump are driven by a common shaft.

* * * * *